3,061,418
Patented Oct. 30, 1962

**3,061,418
JET ENGINE FUEL**
Ivor W. Mills, Glenolden, Pa., assignor to Sun Oil Company, Philadelphia, Pa., a corporation of New Jersey
No Drawing. Filed Sept. 6, 1956, Ser. No. 608,206
4 Claims. (Cl. 44—65)

This invention relates to improved jet engine fuel which contains a small but sufficient amount of a hydroquinone to improve the stability of the fuel.

The thermal stability of jet engine fuels is an important characteristic affecting jet engine operation. In the operation of jet propelled aircraft, the fuel is used as a heat transfer medium for cooling vital components such as engine oil. As a heat transfer medium, the fuel is subjected repeatedly for short periods of time to temperatures in the range of 400° F.–500° F. These high temperatures accelerate gum and sediment formation in the fuel with resulting plugging of filters and other operational difficulties.

Now it has been found that the thermal stability of jet engine fuel can be greatly improved by the addition thereto of a small amount of a hydroquinone. The hydroquinones used in the invention have the formula:

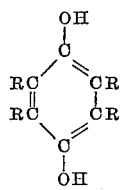

where each R is hydrogen, a hydrocarbon group, or an alkoxy group. In accordance with the invention, these hydroquinones are added to jet fuel in small but sufficient amount to improve the jet fuel stability. Usually amounts of the hydroquinones in the range of about 0.005% to 5% by weight of the resulting fuel mixture, and preferably about 0.01% to 2% give good results. Amounts outside this range can, however, be employed.

The fuels to which the hydroquinones are added comprise mixtures of jet fuel hydrocarbons boiling in the range of about 100° F. to 600° F., usually having freezing points of −76° F. or lower and having low aromatic content and the like. Specifications for various jet fuels are found, for example, on page C–7 of the "Petroleum Engineer," November 1952. These fuels can contain jet fuel additives which are known in the art, e.g., carbon deposit suppressors such as sulfur compounds, in addition to the novel additives of the invention.

The substituent hydrocarbon or alkoxy groups in the hydroquinones employed in accordance with the invention preferably contain less than about 15 carbon atoms per group although larger groups can be employed. Substituent hydrocarbon groups are preferably alkyl groups although aryl, alkaryl and arlakyl groups are also suitable. Examples of suitable hydrocarbon and alkoxy groups are methyl, methoxy, ethyl, ethoxy, n-butyl, tert-butyl, butoxy, n-amyl, tert-amyl, amoxy, dodecyl, phenyl, tolyl, benzyl, and the like.

It is especially preferable to employ dialkyl hydroquinones in carrying out the present invention. However, hydroquinone itself or hydroquinones having 1 to 4 hydrocarbon or alkoxy groups can be employed. Preferred hydroquinones which are used in the invention are 2,5-di-tert-butylhydroquinone, and 2,5-di-tert-amylhydroquinone. Examples of other specific hydroquinones which can be used are hydroquinone, 2-methylhydroquinone, 2-methyl-5-ethylhydroquinone, 2,3,5,6 - tetramethylhydroquinone, phenyl hydroquinone, 2,5-diethoxyhydroquinone, 2 - methoxyhydroquinone 2,5 - diethoxyhydroquinone, and the like.

The following example illustrates the invention:

*Example I*

In accordance with the invention, 2,5-di-tert-butyl-hydroquinone was added to JP–4 jet engine fuel in amount such that the hydroquinone comprised 0.03% by weight of the resulting mixture. This composition and also the base JP–4 fuel were tested in the Erdco Jet Fuel Coker. The base fuel had a fuel goodness rating of 146 while the fuel containing the hydroquinone had a goodness rating of 750. Thus, the 2,5-di-tert-butylhydroquinone effectively improved the stability of the jet fuel.

By way of comparison, the following example, which is not in accordance with the invention, illustrates the relative noneffectiveness of a well-known gasoline stabilizer when used in jet fuel.

*Example II*

A well known gasoline stabilizer 2,6-di-tert-butyl paracresol, was added to JP–4 fuel in amount such that the cresol comprised 0.5% by volume of the resulting mixture. When tested in the Erdco Jet Fuel Coker, the cresol was found to have increased the JP–4 fuel goodness rating from 120 to only 170. These results show that 2,6-di-tert-butyl para-cresol was substantially ineffective in improving the quality of the jet fuel.

I claim:
1. Jet fuel composition consisting essentially of a major proportion of jet fuel hydrocarbons boiling in the range of about 100° F. to 600° F., and from about 0.005 per cent to about 5.0 percent by weight of a hydroquinone having the formula:

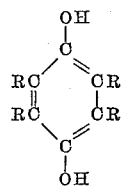

where each R is selected from the group consisting of hydrogen, and less than 15 carbon atom alkyl, alkaryl, aryl, aralkyl and alkoxy groups.

2. The fuel composition according to claim 1 wherein said hydroquinone is a dialkyl hydroquinone, the alkyl groups having less than 15 carbon atoms each.

3. The fuel composition according to claim 1 wherein said hydroquinone is a 2,5-di-tert-butylhydroquinone.

4. The fuel composition according to claim 1 wherein said hydroquinone is a 2,5-di-tert-amylhydroquinone.

References Cited in the file of this patent
UNITED STATES PATENTS

| | | |
|---|---|---|
| 2,560,542 | Bartleson et al. | July 17, 1951 |
| 2,699,385 | Stevens et al. | Jan. 11, 1955 |
| 2,739,048 | Thompson et al. | Mar. 20, 1956 |